(12) United States Patent
Jiang

(10) Patent No.: US 7,706,503 B2
(45) Date of Patent: Apr. 27, 2010

(54) X-RAY OPTIC WITH VARYING FOCAL POINTS

(75) Inventor: Licai Jiang, Rochester Hills, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 0 days.

(21) Appl. No.: 11/943,126

(22) Filed: Nov. 20, 2007

(65) Prior Publication Data

US 2009/0129552 A1    May 21, 2009

(51) Int. Cl.
*G21K 1/06* (2006.01)
(52) U.S. Cl. .......................... 378/84; 378/85
(58) Field of Classification Search ................ 378/46, 378/70, 71, 73, 84, 85, 90, 145, 147, 148, 378/150, 152, 153
See application file for complete search history.

(56) References Cited

U.S. PATENT DOCUMENTS

| | | | | |
|---|---|---|---|---|
| 5,004,319 | A * | 4/1991 | Smither | 359/570 |
| 5,274,435 | A * | 12/1993 | Hettrick | 356/328 |
| 5,604,782 | A * | 2/1997 | Cash, Jr. | 378/85 |
| 5,887,048 | A | 3/1999 | Sata et al. | |
| 5,975,709 | A | 11/1999 | Ebinuma et al. | |
| 6,014,423 | A | 1/2000 | Gutman et al. | |
| 6,041,099 | A | 3/2000 | Gutman et al. | |
| 6,282,259 | B1 * | 8/2001 | Crane | 378/84 |
| 6,330,301 | B1 * | 12/2001 | Jiang | 378/85 |
| 6,389,100 | B1 * | 5/2002 | Verman et al. | 378/84 |
| 6,493,421 | B2 | 12/2002 | Gutman | |
| 6,917,667 | B2 * | 7/2005 | Fujinawa et al. | 378/70 |
| 7,242,746 | B2 * | 7/2007 | Michaelsen et al. | 378/84 |
| 7,245,699 | B2 * | 7/2007 | Verman et al. | 378/85 |
| 7,248,670 | B2 * | 7/2007 | Hoghoj et al. | 378/84 |
| 7,397,900 | B2 * | 7/2008 | Papaioannou et al. | 378/147 |
| 7,403,593 | B1 * | 7/2008 | He et al. | 378/85 |
| 2006/0153332 | A1 * | 7/2006 | Kohno et al. | 378/82 |

FOREIGN PATENT DOCUMENTS

| | | | | |
|---|---|---|---|---|
| JP | 04144224 | | 5/1992 | |
| JP | 06066997 | | 3/1994 | |
| JP | 06258497 | A * | 9/1994 | 378/84 |
| WO | WO 95/31815 | | 11/1995 | |
| WO | WO 2004/079754 A1 | | 9/2004 | |

OTHER PUBLICATIONS

G. Hildenbrand, "Grundlagen der Roentgenoptik und Roentgenmikroskopie" Ergenbnisse Der Exakten Naturwissenschaften, Springer, vol. 30, Jan. 1, 1958, pp. 69-95.
Notification of Transmittal of the International Search Report Dated Mar. 3, 2008, 8 pages.

* cited by examiner

*Primary Examiner*—Irakli Kiknadze
*Assistant Examiner*—Thomas R Artman
(74) *Attorney, Agent, or Firm*—Brinks Hofer Gilson & Lione

(57) ABSTRACT

An x-ray optical device delivers an x-ray beam with variable convergence. The convergence or the divergence of the x-ray beams varies over different parts of the reflector. The device may include an adjustable aperture to further select the convergence or divergence. The adjustable aperture selects the convergence angle by selectively occluding a portion of the x-ray beams.

15 Claims, 2 Drawing Sheets

X-RAY OPTIC WITH VARYING FOCAL POINTS

BACKGROUND

The present invention relates to x-ray optical systems.

Researchers have long employed focusing x-ray optics in x-ray diffraction experiments to increase the flux incident on the sample and to thereby increase the signal to noise ratio. A focusing optic increases the flux by directing a large number of photons through the sample. Moreover, by positioning a detector near or at the focus of the optic, resolution of the system can be greatly improved.

However, the focusing nature of a focusing multilayer optic limits its applicability, since for each application, a different convergence angle, and thus a different optic, is often needed. Thus, a plurality of optics with different focal lengths are used to accommodate the needs of different applications. However, changing the optical elements is costly and time consuming.

Another issue with the focusing optic is that beam intensity is not uniform since the portion of the optic far from the source corresponds to a smaller capture angle. By varying the focal position of the optic, one can design an optic that delivers a uniform beam at a specific location, such as sample location or detector location.

Traditional bending total reflection mirrors have been used to adjust the focal distance to adapt the optic for different applications. However, the alignment and adjustment of bending total reflection mirrors is time consuming and difficult to perform, and any imperfection in the alignment or adjustment of the optic degrades the overall system performance. Further, this approach cannot be used for multilayer optics because of its inability to satisfy both Bragg and geometric conditions.

BRIEF SUMMARY OF THE INVENTION

In overcoming the above mentioned and other drawbacks, the present invention provides an x-ray optical device that delivers an x-ray beam with variable convergence. The convergence or the divergence of the x-ray beams varies over different parts of the reflector. The device may include an adjustable aperture to further select the convergence or divergence. The adjustable aperture selects the convergence angle by selectively occluding a portion of the x-ray beams.

In a general aspect of the invention, an x-ray optical device includes an x-ray source and a reflective element with variable focal points. The variable focal points relate to varying convergence or divergence of an output beam from the x-ray system. The convergence or divergence varies from a near end of the reflective element to a far end of the reflective element. The near end and the far end are defined by the respective positions of the ends relative to the x-ray source.

In certain embodiments, the reflective element has a curved surface and the portion of the beam with the lowest convergence or divergence is delivered from the far end of the reflective element. Alternatively, the portion of the beam with the lowest convergence or divergence is delivered from the near end of the reflective element. Accordingly, the optical device may produce a uniform beam of x-rays toward a sample or a detector.

The optical device may include an adjustable aperture for selecting a portion of the beam, which optimizes the convergence or divergence and flux of the beam. In certain implementations, the surface of the reflective elements varies according to a pre-defined function to provide the varying divergence. For example, the convergence or divergence may vary according to a linear function.

The optical device may include a second reflective element arranged relative to the first reflective element to provide a two-dimensional conditioned beam. Or the reflective element may be a two-dimensional curved surface which provides a two-dimensional conditioned beam.

Further features and advantages of the invention will be apparent from the drawings, detailed discussion, and claims.

DETAILED DESCRIPTION

The present invention provides an x-ray optical device with a reflective element having varying focal points, that is, varying focal distances relative to the reflective element. Thus, a focal point of the x-ray device can be selected for a particular measurement. Hence, the flux and resolution of the device can be easily altered for the needs of different applications or measurements, thereby improving the usability of the overall optical system.

Figure 1:
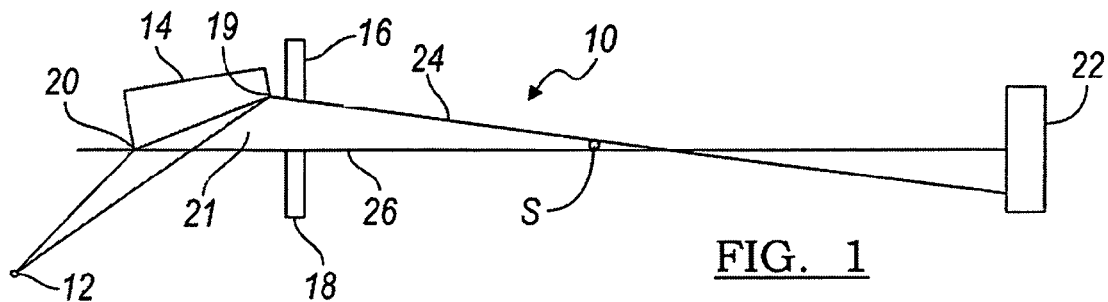
FIG. 1 is a schematic drawing of an x-ray optical system in accordance with the present invention.

In accordance with an embodiment of the invention, FIG. 1 illustrates an x-ray optical device 10 including an x-ray source 12, an x-ray reflective optic 14, a top blade 16 and a bottom blade 18. The x-ray source 12 can be a laboratory source, such as a high brilliance rotating anode x-ray generator or a microfocusing source, and the x-ray reflective optic 14 can be a focusing multilayer optic with one or two reflective planes, a total reflection optic, or an x-ray reflective crystal.

In operation, the source 12 emits an x-ray field of beam toward the reflective optic 14, which in turn reflects the beam through an aperture 21 defined by the blades 16 and 18 toward a sample S; after the beam passes the sample, the beam, which can be either a direct beam or a diffracted beam is captured by a detector 22. The x-ray field reflected by the optic 14 generally includes a top portion 24 reflected by a far end 19 of the optic 14 and a bottom portion 26 reflected by a near end 20. An aperture with a fixed size, for example, either with a square profile or a round profile, can be used to replace the adjustable aperture 21. The selection of the beam in such an arrangement case is realized by moving the aperture.

Figure 2:
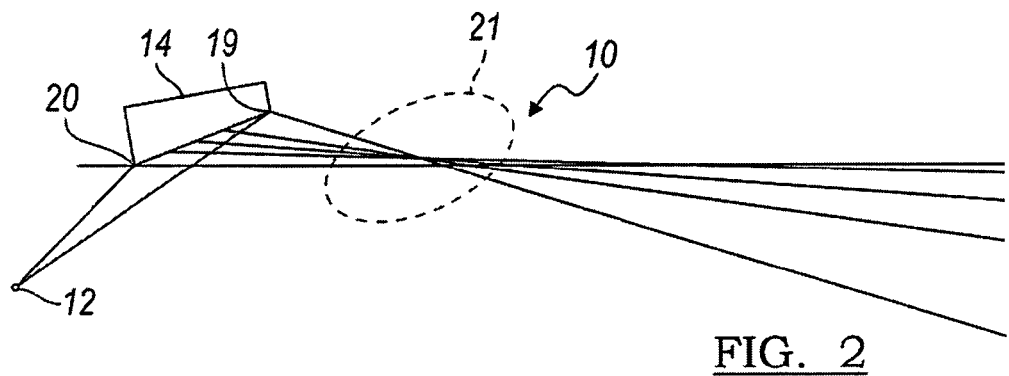
FIG. 2 is a schematic drawing of the x-ray optical system with varying focal points.

The optic 14 can have various surface designs depending on the requirements of the particular application. In some implementations, the reflective surface of the optic 14 is designed so that the reflected beams from the optic 14 from the far end 19 to the near end 20 are projected towards the detector 22 uniformly. In other implementations, the convergence/divergence across the reflective surface varies according to a pre-defined function. As shown in FIG. 2, the optic 14 may have different focal points from different parts of the optic 14 as indicated by the intersection of the rays 21 at different positions relative to the optic 14. The function can be determined by the beam uniformity at a predefined position, such as the position of the detector 22. The function can be linear; that is, the intersection of the rays across a base line vary uniformly. In the particular embodiment shown in FIG. 1, the optic 14 is a focusing optic with a convergence angle that is large enough for a particular set of applications, such as for protein crystallography with typical unit cells ranging from about 80 angstroms to about 500 angstroms. With a sample of small unit cell, the portion of the beam with larger convergent angle should be selected to increase the flux; with a sample of large unit cell, the portion of the beam with smaller convergence should be selected to improve the beam resolution.

Figure 3:
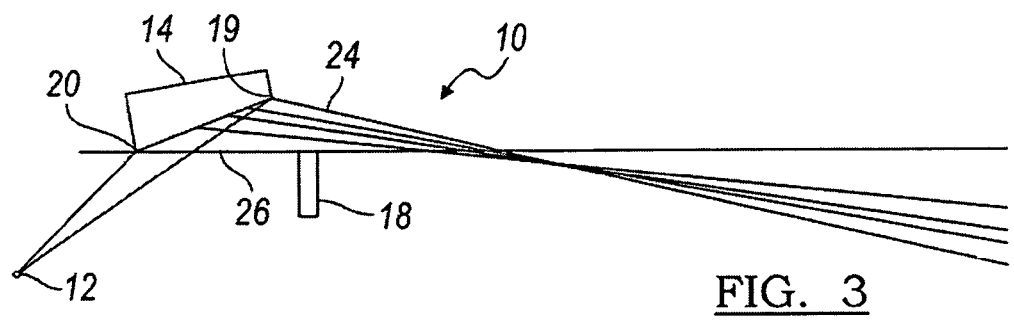
FIG. 3 is a schematic drawing of the x-ray optical system with a uniform beam at a sample position.

An optic with varying focal distance can be easily achieved as shown in FIG. 3, where the rays from a portion of the optic cross the rays from the portion of the optic nearer to source at an increasing distance from the source. That is, the x-rays delivered by the far end of the optic has less convergence and the x-rays from the near end of the optic has higher convergence. A portion of the beam with suitable divergence can be selected for a specific application (or a particular sample of the same application).

The x-ray device 10 is particularly well suited for delivering a uniform beam toward the sample position or detector position, such as a biological sample or protein molecule. A uniform beam at the sample position or the detector position may be needed for easy modeling. For a reflective optic, the capture angle density is smaller at the far end 19 of the optic 14. Thus, the beam delivered by the far end 19 of the optic to the detector 22 typically has a lower density than that delivered by the near end of an elliptic mirror. Hence, by employing an optic with a variable focal lens, that is, a lens that includes a far end with higher convergent angle and shorter focal length and a near end with lower convergent angle with longer focal length, the beam can be designed to be uniform at a selected location, such as the sample position or the detector position.

Figure 4:
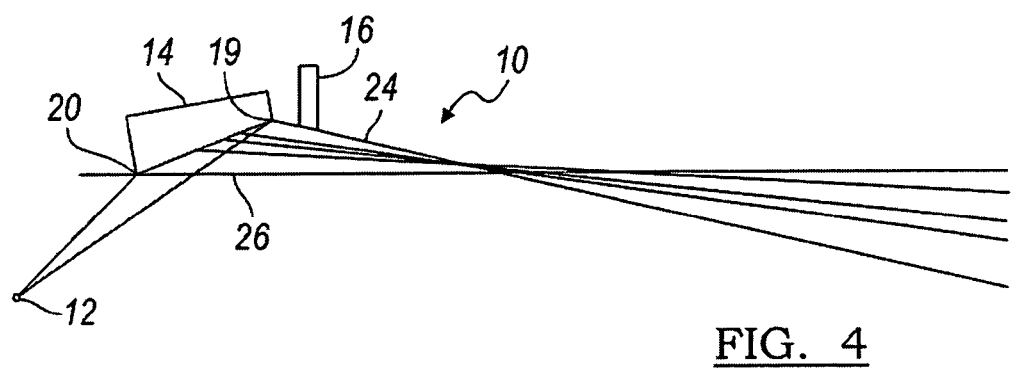
FIG. 4 is a schematic drawing of the x-ray optical system with a uniform beam at a detector position.

As mentioned above, the optic 14 can be designed to provide varying divergence (or convergence). For example, as shown in FIG. 4, the x-ray optical device 10 is well suited for providing varying divergence. In this arrangement, the lower portion 26 of the beam delivered from the near end 20 has the lowest convergence (or divergence after the focal point), such that the convergence of the beam from the optic 14 increases from the near end 20 to the far end 19. Accordingly, the top blade 16 is positioned as shown in FIG. 4 where the beam has the highest divergence. It should be noted that the loss of flux attributed to obtain the low divergence in the arrangement shown in FIG. 4 is less than that associated with the arrangement shown in FIG. 3.

Figure 5:
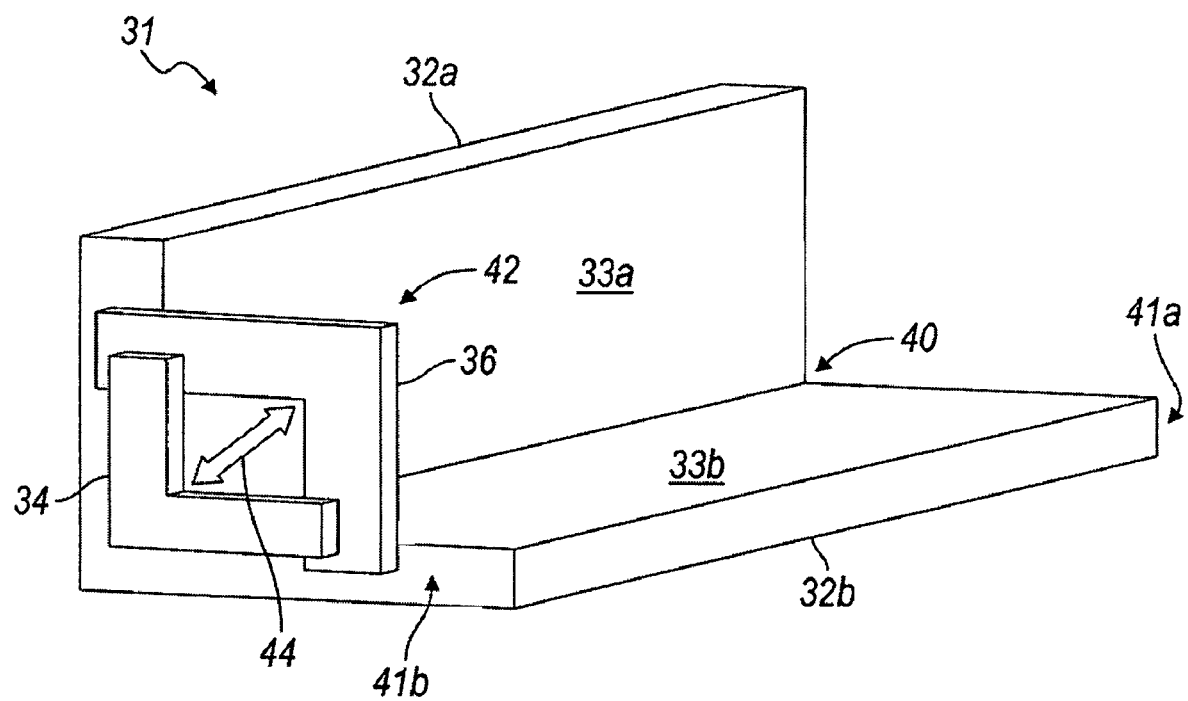
FIG. 5 is a perspective view of a two-dimensional x-ray optical device in accordance with the invention.

Turning now to FIG. 5, there is shown an x-ray optical device 31 with an integrated adjustable aperture 42 in accordance with another embodiment of the present invention. A set of Cartesian axes is also provided in the figure to better illustrate the operation of the x-ray optical device 31.

To vary the convergence of an x-ray beam in two dimensions, the x-ray optical device 31 includes a confocal optic 40 to which the adjustable aperture 42 is attached. Note that the adjustable aperture 42 can be located in close proximity to the confocal optic 40 and therefore does not have to be attached to the confocal optic 40.

The confocal optic 40 includes a first optical element 32a lying in the y-z plane and a second optical element 32b lying in the x-z plane. The first and second optical elements 32a, 32b define a first reflective surface 33a and a second reflective surface 33b, respectively. In certain arrangements, the near or proximal portion 41a of the confocal optic 40 is located closest to an x-ray source, and therefore the far or distal portion 41b is located farther from the x-ray source. When the confocal optic 40 is in use, x-rays propagate along an optical axis, which are substantially parallel to the z-axis.

In some implementations, the first and second optical elements 32a, 32b, as well as the optic 14 described earlier, are multilayer reflectors with graded d-spacing. Specifically, the first and second optical elements 32a, 32b may have either laterally graded d-spacing or depth graded d-spacing. Depending on the type of measurements performed with the x-ray optical device 31, both the first reflective surface 33a and the second reflective surface 33b may have either a focusing or collimating shape or the reflective surfaces 33a and 33b may have different geometries. For example, one surface can have an elliptic shape and the other can have a surface with variable focal length. The design of the surfaces 33a and 33b may be similar to that of the optic 14 described earlier. That is, the surfaces 33a and 33b can be designed so that the optical device 31 provides varying focal points and varying divergence or convergence.

Accordingly, various embodiments of the present invention are directed to an x-ray optical device varying focal points. In particular, the optic has a varying divergence or convergence to optimize the beam divergence or convergence, as well as the flux incident on a sample. In one application, the divergence delivered by the optic varies from a low divergence at the far end of the optic relative to the x-ray source to a higher divergence at the near end of the optic. In another application, the divergence delivered varies form a low divergence at the near end to a higher divergence at the far end of the optic. This arrangement provides for lower loss of flux associated with the lower divergence.

Although various implementations of the invention have been described above, other implementations are also within the scope of the following claims. For example, the aperture can be formed from four individual blades or from two angles blades. Alternatively, the aperture can be a round pinhole, such that selecting a portion of the beam involves a position change of the pinhole. The optical device of claim may include a second reflective element arranged relative to the first reflective element to provide a two-dimensional conditioned beam. Alternatively, the reflective element may be a two-dimensional curved surface which provides a two-dimensional conditioned beam.

What is claimed is:

1. An x-ray optical device comprising:
an x-ray source generating an x-ray beam; and
a reflective element for receiving the x-ray beam and having variable focal points such that the convergence of an x-ray output beam varies across a surface of the reflective element according to a pre-defined function the convergence varying from a near end of the reflective element to a far end of the reflective element, the near end and the far end being defined by the respective positions of the ends relative to the x-ray source.

2. The optical device of claim 1 wherein the reflective element has a curved surface and wherein the portion of the x-ray output beam with the lowest convergence is delivered from the far end of the reflective element.

3. The optical device of claim 1 wherein the reflective element has a curved surface and wherein the portion of the x-ray output beam with the lowest convergence is delivered from the near end of the reflective element.

4. The optical device of claim 1 wherein the optical device delivers a uniform x-ray output beam of x-rays toward a sample or a detector.

5. The optical device of claim 1 further comprising an adjustable aperture for selecting a portion of the x-ray output beam which optimizes the convergence and flux of the x-ray output beam.

6. The optical device of claim 5 wherein the aperture is made of four individual blades.

7. The optical device of claim 5 wherein the aperture is made of two angled blades.

8. The adjustable aperture in claim 5 wherein the aperture is a round pinhole, the portion of the x-ray output beam being selected by changing the size of the pinhole.

9. The optical device of claim 1 wherein a portion of the beam is occluded, the non-occluded portion of the x-ray output beam having a desired convergence.

10. The optical device of claim 1 wherein the surface of the reflective element varies according to a pre-defined function to provide the varying convergence.

11. The optical device of claim 10 wherein the convergence varies according to a linear function.

12. The optical device of claim 10 wherein the reflective element provides a uniform x-ray output beam at a certain location.

13. The optical device of claim 1 further comprising a second reflective element arranged relative to the first reflective element to provide a two-dimensional conditioned x-ray output beam.

14. The optical device of claim 1 wherein the reflective element is a two-dimensional curved surface, which provides a two-dimensional conditioned x-ray output beam.

15. The optical device of claim 1 wherein the varying convergence across the x-ray output beam produces the varying focal points simultaneously.

* * * * *